Nov. 24, 1959  P. W. CURTIS  2,913,866
CATCHER FRAME FOR FRUIT AND NUTS
Filed Feb. 17, 1958  4 Sheets-Sheet 1
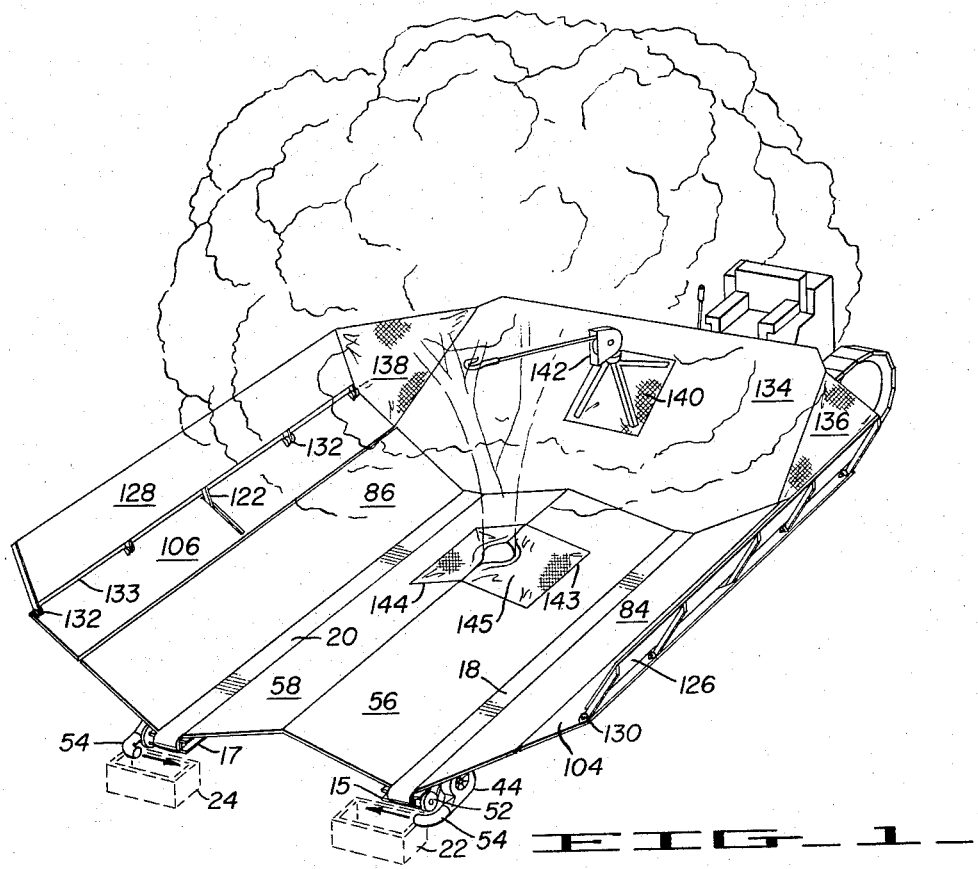
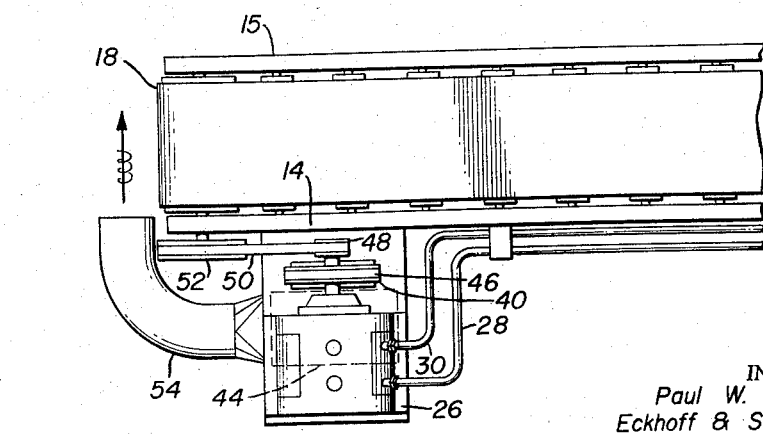
INVENTOR.
Paul W. Curtis
Eckhoff & Slick, Attys.
BY
*A member of the firm*

Nov. 24, 1959   P. W. CURTIS   2,913,866
CATCHER FRAME FOR FRUIT AND NUTS
Filed Feb. 17, 1958   4 Sheets-Sheet 2
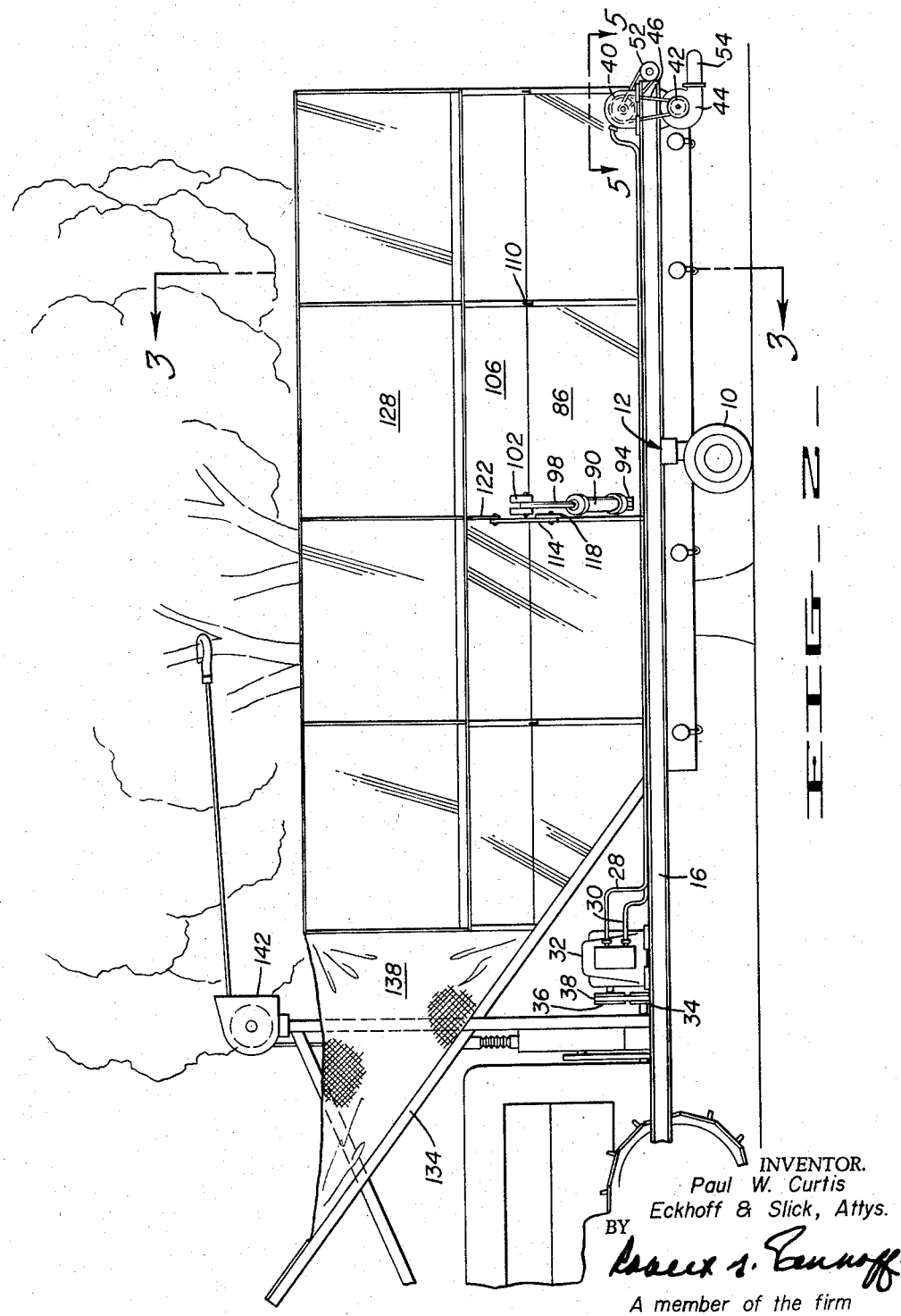
INVENTOR.
Paul W. Curtis
Eckhoff & Slick, Attys.
BY
A member of the firm

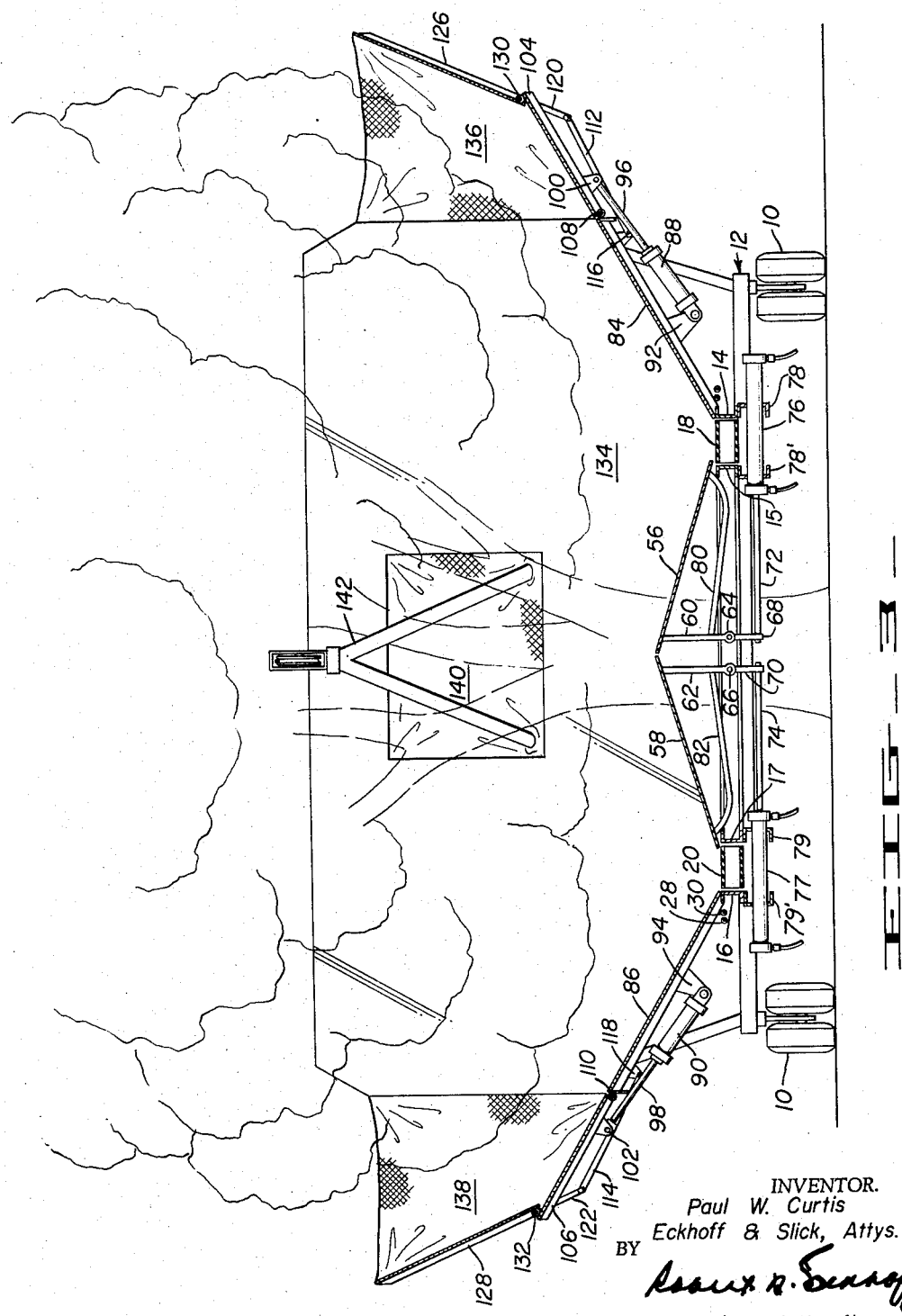

Nov. 24, 1959   P. W. CURTIS   2,913,866
CATCHER FRAME FOR FRUIT AND NUTS

Filed Feb. 17, 1958   4 Sheets-Sheet 4

INVENTOR.
Paul W. Curtis
BY Eckhoff & Slick, Attys.
A member of the firm

United States Patent Office 2,913,866
Patented Nov. 24, 1959

2,913,866

CATCHER FRAME FOR FRUIT AND NUTS

Paul W. Curtis, Gerber, Calif.

Application February 17, 1958, Serial No. 715,573

3 Claims. (Cl. 56—329)

This invention relates in general to nut and fruit picking machines and more particularly to an apparatus for use in conjunction with equipment for shaking trees bearing deciduous fruit or nuts, this invention involving that segment of the apparatus used for gathering the nuts or fruit which fall from the limbs.

It is an object of this invention to provide a movable gathering device which may be used to envelop the base of a tree so as to provide a receiving table therebeneath for receipt of fruit or nuts.

A further object of this invention is to provide a partially collapsible gathering table which may be readily moved about an orchard between rows of fairly closely spaced trees.

Still another object of this invention is to provide a structure which is capable of gathering fruit or nuts which may drop from a tree bearing the same and which is also capable of separating and discarding the twigs and leaves which may chance to fall onto the table.

Still another object of this invention is to provide a receiving table which is composed of inclined deflectors leading to a pair of conveyors, the centermost deflectors of which may be moved laterally backwards so as to provide room for the entrance of a tree trunk, these deflectors being provided with means to support them above the conveyor surface as they are being retracted, thereby avoiding injury to any fruit which may remain on the conveyors.

Yet another object of this invention is to provide a fruit and nut gathering table which is capable of receiving deciduous fruit and nuts from trees and thereafter conveying them into containers therefor.

Other objects and advantages of this invention, if not specifically set forth, will become apparent during the course of the description which follows.

In the drawings:

Figure 1 is an isometric view of the gathering table of this invention in position beneath the boughs of a tree, the tree being shown in outline form;

Figure 2 is a side elevational view of the gathering table of this invention;

Figure 3 is a sectional view taken along line 3—3 of Figure 2 showing the gathering table and conveying apparatus of this invention;

Figure 4:
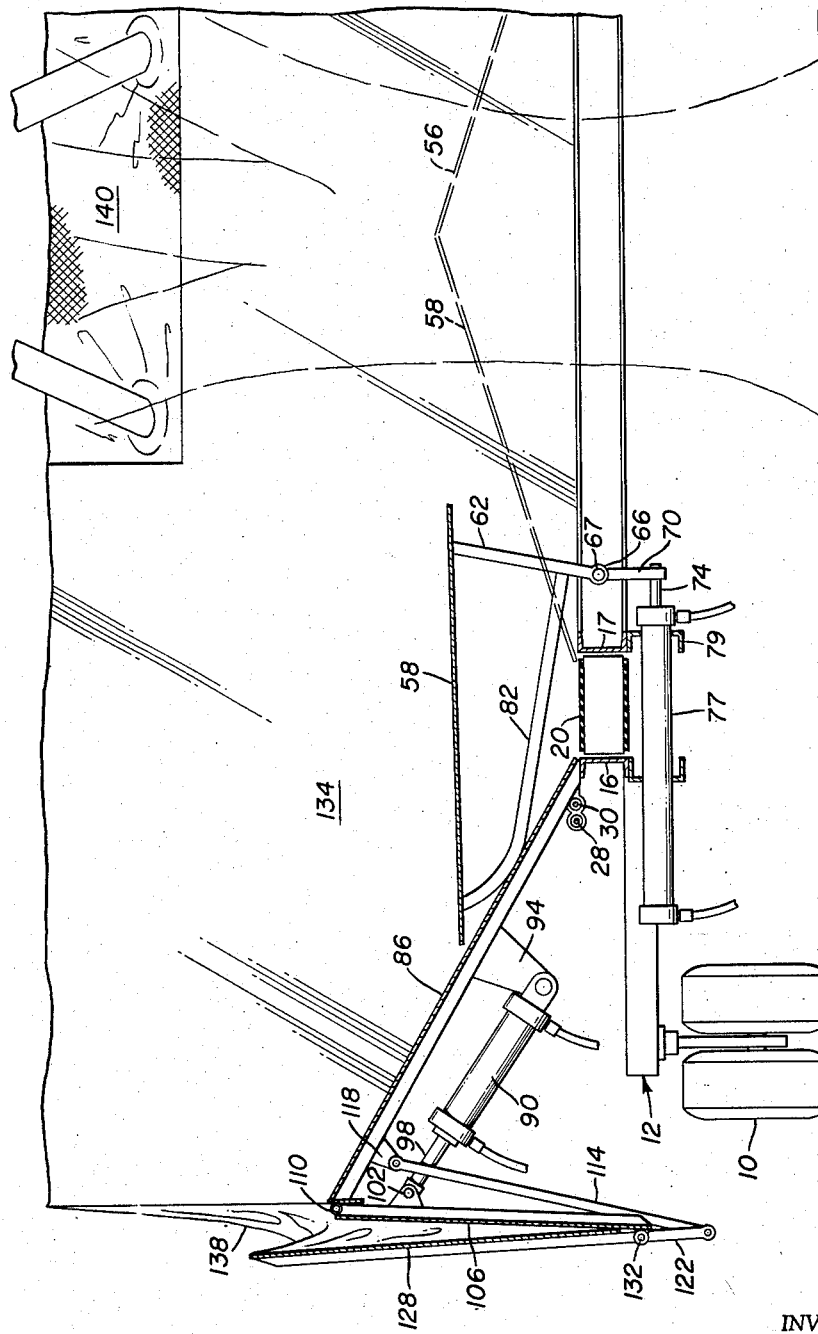

Figure 4 is an enlarged view of a portion of the device shown in Figure 3 showing the method by which the side wings or deflectors may be caused to fold so as to enable the movement of the table through an orchard; and Figure 5 is an enlarged top plan view of a portion of one of the two conveyors used in conjunction with the gathering table structure particularly showing the drive means and blower apparatus used to separate leaves and twigs from the fruit or nuts.

Generally, this invention comprises a mobile nut and fruit harvesting apparatus which may be used in conjunction with a tree shaker including a frame mounted on wheels, a pair of spaced parallel conveyors disposed longitudinally of and mounted on a frame, a source of power for driving conveyors toward one end of the frame, a pair of deflectors bridging the area between the conveyors and meeting in the middle, the deflectors being normally inclined downwardly toward the conveyors and upwardly toward the medial line of the frame, means for laterally retracting the deflectors, to provide, when necessary, a longitudinal slot between the conveyors for accommodation of a tree trunk, guides positioned below the deflectors for raising the deflectors above the conveyor surfaces as the deflectors laterally retract, additional deflector surfaces extending outwardly and upwardly from the exterior sides of the longitudinally extending conveyors and, finally, outwardly and upwardly from the rearward ends of the conveyors. Thus, a device is provided which is in the nature of an open-ended table with sloping sides and a base which also slopes thereby causing any fruit or nuts dropped upon the table to roll down toward the conveyors and thereafter to be advanced to receiving boxes. In a preferred embodiment of the invention, blowers are positioned at the discharge ends of the conveyors which direct blasts of air parallel to the conveyor surfaces and laterally thereof so as to remove bits of twigs, leaves, etc., which may be mixed with the fruit. Further, in order to provide for mobility in a tightly planted orchard, the outwardly extending deflectors are provided with hinges so that they may be collapsed when necessary. Preferably these collapsible sections are provided with a system of hydraulic cylinders so that the collapsing and extending operations may be readily effected.

Referring now to the drawings wherein like characters refer to like parts throughout, wheels 10 support frame 12. Included as part of the framework are two sets of parallel U-beams 14 and 15, 16 and 17 which stretch the entire length of the structure, one pair enclosing each of the conveyors 18 and 20. As shown in Figure 1, these conveyors extend substantially the entire length of the structure and discharge at the open (forward) end thereof. Cartons 22 and 24 are placed below the point at which these conveyor belts turn downwardly to commence their return trip. As can be seen in Figures 2 and 5, the conveyors are individually driven by fluid motors located at the conveyor discharge points shown in Figure 5. The motors are of conventional construction. Each motor is provided with fluid supply and return lines designated 28 and 30 (Figure 4).

A fluid pump 32 provides circulation in lines 28 and 30. Obviously, a different source of fluid pressure may be located elsewhere and used in place of pump 32. The fluid pump in turn is driven by a belt and pulley arrangement operating off the power take-off of the tractor. More specifically, a pulley 34 is mounted on the end of the power take-off with a second pulley 36 on the fluid pump. These are joined by V-belt 38.

Considering the individual fluid motors for the moment, a pulley 40 is keyed to the shaft of the motor and this pulley drives pulley 42 of blower 44 through V-belt 46. Pulley 42 is actually located on the inside of blower 44 and hence is not visible when one side of the structure is viewed. However, it has been included in Figure 2 for the sake of clarity. In addition, a smaller pulley 48 is also keyed to the shaft of the fluid motor 26 and through V-belt 50 drives the pulley 52 of conveyor 18. The blower 44, shown most clearly in Figures 1 and 2, is provided with suitable duct work 54 for directing a blast of air laterally across the discharge end of the conveyor. A single fluid motor may be used instead of the two described above—a cross shaft to drive the second conveyor and blower being necessary in this case.

Considering now the components making up the catching and deflecting table, there is provided a pair of inner deflectors 56 and 58 bridging the area between the parallel conveyors 18 and 20. As shown in Figures 3 and 4, these deflectors are normally inclined upwardly so as to form a ridge extending longitudinally of the catching table and are suported on frames 60 and 62 respectively. These frames are respectively pivoted on rods 64 and 66, in turn supported by bars 68 and 70 which are mounted on piston rods 72 and 74 of hydraulic or air cylinders 76 and 77 which depend from brackets which are secured to the undercarriage of the catcher. Specifically, cylinder 77 depends from brackets 79 and 79' which in turn are supported by U-beams 17 and 16 and cylinder 76 is supported by brackets 78 and 78' which in turn are supported by U-beams 14 and 15. A suitable bracing structure may be required also, but this has been omitted from the drawings for the sake of clarity in exposition of the more essential operating parts. Such bracing structure preferably consists of a series of rollers, not shown, supporting piston rods 72 and 74 from beneath the rollers being secured to the undercarriage.

In addition to the supporting rods 60 and 62 for deflectors 56 and 58, these deflectors are provided with shoes (preferably simply bent rods) designated 80 and 82 respectively. When the deflectors are contiguous, as shown in Figure 3 or by the dotted lines of Figure 4, the curved ends of the shoes 80 and 82 drop beneath the upper edge of the inner U-beams 15 and 17. Two or more of these shoes 80 and 82 may be spaced longitudinally of the deflectors 56 and 58 so as to provide additional stability. Suitable brackets or supports, which have been omitted from the drawings in the interest of facilitating presentation of the essential features, may be provided for lending additional rigidity and support to the deflectors 56 and 58.

Extending outwardly and upwardly from the conveyors 18 and 20 are additional deflectors 84 and 86. Beneath each of these deflectors is pivoted an hydraulic or air cylinder, 88 or 90, on suitable brackets 92 and 94 respectively. The piston rods 96 and 98 of the cylinders are in turn pivoted to brackets 100 and 102 mounted beneath additional deflectors 104 and 106. These additional deflectors are hinged at points 108 and 110 to the adjoining deflectors 84 and 86 respectively. Additional rods are provided on either side for purposes of increasing the rigidity of the structure, these rods being two-piece structures. The longer of these rods, designated 112 and 114, are hingedly mounted on brackets 116 and 118 respecitvely beneath deflectors 84 and 86. The shorter portions of this reinforcing structure, the rods 120 and 122, are pivoted to the larger rods 112 and 114. The far ends of these smaller rods are fixedly secured in position on deflectors 126 and 128 in the same plane thereof. These additional deflectors are hinged at points 130 and 132 to the lower deflectors 104 and 106. Preferably, the dividing lines between deflectors 128 and 106 as well as 126 and 104 constitute slots of about a two inch width, thus providing for the discharge of leaves and swigs as the deflectors assume the folded position shown in Figure 4. One of these slots is shown clearly in Figure 1 and is designated 133.

As can be seen in Figure 1, that portion of the structure which is nearest the tractor is also in the form of an inclined table or deflector designated 134 which is joined at the upper corners to the rest of the structure by the use of suitable webbing 136 and 138. A cutout area 140 is provided in this deflector so as to provide entrance for the tree shaking apparatus designated generally 142.

Each of the deflectors 56 and 58 is provided with a rectangular cutout area designated 143 and 144 for accommodation of a tree trunk. When the table is in place beneath the tree, any unoccupied space is filled with a suitable webbing 145 as shown in Figure 1 so as to prevent any of the fruit or nuts dropping through to the ground.

The deflectors are preferably constructed of sheet metal or fabricated glass laid over a grid work. Alternatively, a flexible resilient fabric may be mounted on the frame or sheet metal may be covered with sponge rubber.

In operation, the deflectors 56 and 58 are slid laterally by the action of piston rods 72 and 74. The ski-shaped shoes 80 and 82 ride against the upper edges of U-beams 15 and 17 thereby causing the deflectors to lift as they are retracted. This prevents any contact of the deflectors with any fruit or nuts which may remain on the conveyor belts. The structure is then pushed, preferably by use of a tractor, toward the tree to be shaken and the trunk guided through the slot provided by the withdrawal of deflectors 56 and 58. When the tree trunk has reached the position shown in Figure 1, the deflectors are again closed and the necessary webbing shown in Figure 1 placed about the trunk. The deflectors farthest removed from the center of the device, deflectors 126, 104, 128 and 106, are initially in a folded position as shown in Figure 4. Hydraulic pressure is applied through cylinders 88 and 90 thereby causing the sides to assume the relationship shown in Figure 3. The tree is thereafter shaken and the conveyors operated to discharge the fruit or nuts, as the case may be, into boxes 22 and 24. Simultaneously with the operation of the conveyors, the fluid motors supply power to the blowers mounted adjacent the conveyor motors. A blast of air is directed across the conveyor belts at points where they discharge their contents into the boxes. This blows the relatively light leaves, twigs, etc., onto the ground. The blowers obviously must supply air at a substantial pressure to accomplish this.

An oil reservoir and pump are necessary to supply the fluid pressure to the various cylinders and this ordinarily is mounted on the tractor together with the cylinder control apparatus. The structures of these elements are conventional and will not be described here.

Obviously it is also possible to use alternative power sources to those disclosed for driving the conveyor or supplying the necessary blast of air.

Many modifications and variations of the invention as hereinbefore set forth may be made without departing from the spirit and scope thereof, and therefore only such limitations should be imposed as are indicated in the appended claims.

I claim:

1. In a mobile nut and fruit harvesting apparatus for use in conjunction with a tree shaker, the improvements comprising: a frame; a pair of spaced parallel conveyors disposed longitudinally of said frame and secured thereto; means operatively associated therewith for driving said conveyors toward one end of said frame; a pair of deflectors mounted on said frame bridging the area between said conveyors and meeting in the middle thereof, said deflectors being normally inclined downwardly from said middle toward said conveyors, said deflectors having cutout portions therein for embracing a tree trunk when closed; means mounted on said frame for laterally retracting said deflectors whereby to provide a longitudinal slot between said conveyors for passage of said tree trunk between said conveyors; guides positioned below said deflectors and secured thereto for raising said deflectors above the conveyors when said deflectors are laterally retracted; and additional deflectors secured to said frame extending outwardly and upwardly from the exterior side of said longitudinally extending conveyors and outwardly and upwardly from the rearward ends of said conveyors.

2. The structure of claim 1 wherein blowers are secured to said frame and positioned at the discharge end of said conveyors transversely thereof whereby to provide means for separating relatively light leaves and twigs from relatively heavier fruit and nuts.

3. The structure of claim 1 wherein the said guides for the first mentioned deflectors are rods secured at either end thereof beneath said deflectors and laterally of said deflectors, said rods having arcuate tips on the ends thereof secured to that portion of said deflectors nearest said conveyors, said arcuate tips being positioned to ride over said conveyors and simultaneously raise said deflectors when said deflectors are retracted and wherein power driven piston rods are secured to said frame adjacent to said deflectors for laterally retracting said deflectors, each of said deflectors being hingedly mounted to a piston rod.

References Cited in the file of this patent

UNITED STATES PATENTS

| | | |
|---|---|---|
| 2,436,648 | Isom | Feb. 24, 1948 |
| 2,602,279 | Leighton | July 8, 1952 |
| 2,692,470 | Boman | Oct. 26, 1954 |